United States Patent Office 3,161,586
Patented Dec. 15, 1964

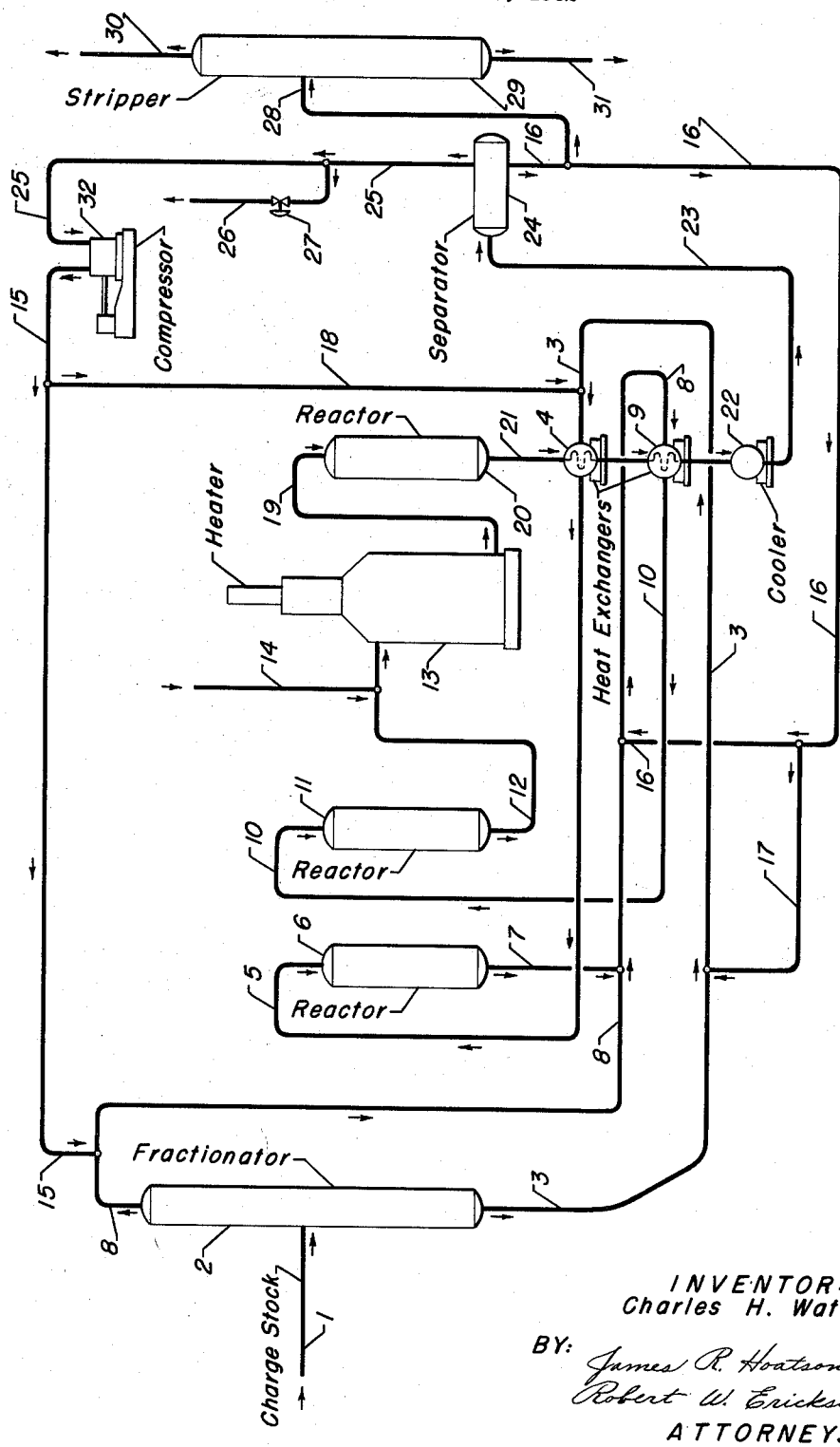

3,161,586
HYDROREFINING OF COKE-FORMING HYDRO-
CARBON DISTILLATES
Charles H. Watkins, Arlington Heights, Ill., assignor to
Universal Oil Products Company, Des Plaines, Ill., a
corporation of Delaware
Filed Dec. 21, 1962, Ser. No. 246,458
9 Claims. (Cl. 208—264)

The present application is a continuation-in-part of my copending application, Serial No. 84,155, now Patent No. 3,133,013, filed January 23, 1961.

The present invention relates to the hydrorefining of hydrocarbons, mixtures of hydrocarbons, various hydrocarbon fractions and hydrocarbon distillates, for the purpose of removing diverse contaminants therefrom, and/or reacting such hydrocarbons to improve the chemical and/or physical characteristics thereof. More specifically, the process described herein is directed toward the selective hydrogenation of unsaturated, coke-forming hydrocarbons through the use of particular conditions of operation and processing techniques whereby the formation of coke and other heavy carbonaceous material, otherwise resulting from the hydrorefining of such hydrocarbon fractions and/or distillates, is effectively inhibited.

In the present specification and appended claims, the various terms, "hydrocarbons," "hydrocarbon fraction," "hydrocarbon distillate," and "hydrocarbon mixture," are intended to be synonymous, and connote various hydrocarbons and mixtures of hydrocarbons which may result, for example, from prior, diverse conversion processes, or from the separation and/or fractionation of various crude oils. Such processes include the catalytic and/or thermal cracking of petroleum, the destructive distillation of wood or coal, shale-oil retorting, etc., and which yield various hydrocarbon mixtures which may be subsequently advantageously employed as fuels, lubricants, and petro-chemical materials, or as charge stocks in subsequent processes designed for the production thereof. Such hydrocarbon distillate fractions frequently contain impurities which must necessarily be removed before they become suitable for their intended use, or which, when removed, enhance the value of the distillate fractions for further processing. These impurities include sulfurous compounds, nitrogenous compounds, oxygenated compounds, and various metallic contaminants which cause the hydrocarbon distillates to exhibit corrosive tendencies and be foul-smelling, thereby making them less desirable for further utilization as a fuel oil or lubricant, or otherwise.

Generally, the most prevalent of the aforementioned impurities is combined sulfur which may exist in the hydrocarbon fraction as a sulfide, mercaptan, or as thiophenic sulfur, etc. The combined sulfur is generally removed by the process of hydrodesulfurization, wherein the sulfur-bearing molecule is reacted at elevated temperature, generally in excess of about 500° F., and usually at a higher temperature of the order of about 700° F., in the presence of hydrogen. The hydrodesulfurization reaction is conducted utilizing a suitable catalytic composite whereby the molecules are converted to hydrocarbons and hydrogen sulfide, the latter being removed from the process as a gaseous waste material. The hydrodesulfurization treatment is also effective in removing nitrogen-bearing molecules by conversion thereof into hydrocarbons and ammonia, the latter either being removed in a gaseous phase, or adsorbed from the liquid product effluent. When existing in some combined form, oxygen offers somewhat less of a removal problem than either sulfur or nitrogen. Under the operating conditions generally employed, the oxygenated compounds are converted to the hydrocarbon counterpart and water, the latter being removed from the hydrocarbon product by any well known and suitable separation means.

However, in addition to the aforementioned contaminating influences, the hydrocarbon distillates resulting from the various conversion processes hereinbefore set forth, contain appreciable quantities of unsaturated hydrocarbons, both mono-olefinic and diolefinic, the latter including compounds such as styrene, isoprene, dicyclopentadiene, etc. When these unsaturated hydrocarbon distillates are subjected to a hydro-refining process for the purpose of removing sulfur, nitrogen and oxygen, and to effect the saturation of such olefinic hydrocarbons, there frequently is encountered the difficulty of promoting the desired degree of reaction due to the formation of coke and other heavy carbonaceous material. The deposition of the coke appears to be an inherent result of the necessity to effect the hydrorefining reactions at elevated temperatures above about 500° F. Various heaters and miscellaneous appurtenances of the conversion zone experience heavy coking; this appears as the formation of solid, highly carbonaceous material resulting from the thermal reactions of the unstable or coke-forming compounds within the hydrocarbon distillate being charged to the unit. In addition, polymerization and copolymerization of the mono-olefins and diolefins are effected within the reaction zone, and to the extent that the catalyst disposed therein becomes shielded by gummy polymerizaion products, thereby becoming inaccessible to the hydrocarbon distillate being processed.

As hereinbefore set forth, coke-forming hydrocarbon distillates are usually those resulting from prior severe conversion treatments such as catalytic or thermal cracking, or destructive distillation. These distillates and/or hydrocarbon fractions are available in a large quantity, and generally require the hydrode-sulfurization treatment for the purpose of enhancing the possibilities for further usefulness. In many instances, the hydrocarbon distillate will not contain excessive quantities of sulfurous and nitrogenous compounds, but will consist of detrimentally large amounts of mono-olefins and diolefins, and to the extent that the subsequent use of the hydrocarbon distillate is prohibited. For example, in a thermal cracking process for the production of ethylene, a full boiling range hydrocarbon product, having an initial boiling point of from about 100° F. to about 150° F., and an end boiling point in excess of about 400° F., and containing about 1000 p.p.m. each of sulfur and/or nitrogen, is produced as a normally liquid by-product. This liquid hydrocarbon mixture contains olefinic hydrocarbons in an amount to indicate a bromine number of the order of at least about 50.0, and diolefinic hydrocarbons in an amount to indicate a diene value of the order of about 25.0 or more. In addition, a hydrocarbon distillate of this nature generally contains sufficient aromatic hydrocarbons to warrant treating the hydrocarbon distillate to recover substantially pure aromatic concentrates. Regardless of its intended use, as a motor fuel blending component, fuel oil, lubricant, or as charge material for subsequent processing, such as in an aromatic recovery unit, it is generally necessary to subject the hydrocarbon distillate to a hydrodesulfurization process for the purpose of removing the various contaminating influences.

The hydrorefining of a highly unsaturated distillate, such as the liquid by-product above described, gives rise to certain difficulties inherently occurring in the conditions of operation required to achieve an efficient, acceptable process. The presence of the mono-olefins and diolefins induces the formation of coke and high-molecular weight polymerization products within the attendant manifolding of the process, and onto the catalytic composite being employed, thereby shielding the latter from the material being processed. I have found that this difficulty may be overcome by effecting a hydrorefining process in individual stages; the distillate is first treated, in the presence of hydrogen, at a temperature less than about 500° F., for the purpose of effecting at least a partial saturation of the diolefins and mono-olefins, and subsequently is treated at a temperature in excess of 500° F., for the purpose of removing various contaminants and to complete the saturation of the olefinic hydrocarbons. I have further found, however, that the inclusion of the heavier unsaturated hydrocarbons, those boiling above about 300° F., within the charge stock to the process, results in a deleterious degree of copolymerization with the lighter, unsaturated hydrocarbons, notwithstanding that the operating temperature is such that polymerization of the lighter unsaturated hydrocarbons would not be effected to a great degree in the absence of the heavier material.

It is a primary object of the present invention to provide a series of processing techniques for the efficient multi-stage hydrorefining of a full boiling range, unsaturated hydrocarbon distillate without incurring the excessive deposition of coke and undesirabe polymerization products.

Therefore, a broad embodiment of the present invention affords a process for hydrorefining an unsaturated, coke-forming hydrocarbon distillate, which process comprises initially fractionating said distillate to provide a light fraction and heavy fraction, reacting one of said fractions and hydrogen in a first reaction zone, combining at least a portion of the effluent from said first reaction zone with the unreacted fraction, reacting the resulting mixture and hydrogen in a second reaction zone, and passing the second zone effluent into a third reaction zone; effecting further reaction of said distillate and additional hydrogen in said third reaction zone, and recycling at least a portion of the effluent from said third zone to combine with at least one of the aforesaid light and heavy fractions prior to reacting the same in said first and second reaction zones.

Another broad embodiment of the present invention relates to a process for hydrorefining an unsaturated, coke-forming hydrocarbon distillate which comprises initially fractionating said distillate to provide a light fraction and a heavy fraction, reacting said heavy fraction and hydrogen in a first reaction zone, combining at least a portion of the effluent from said first zone with said light fraction, reacting the resulting mixture with hydrogen in a second reaction zone, and passing the second zone effluent into a third reaction zone; effecting further reaction of said distillate and additional hydrogen in said third reaction zone and recycling at least a portion of the effluent from said third reaction zone to combine with the aforesaid light and heavy fractions prior to reacting the same in said second and first reaction zones, respectively.

More specifically, the present invention provides a process for hydrorefining an unsaturated, coke-forming hydrocarbon distillate, which process comprises initially fractionating said distillate to provide a light fraction having an end boiling point of from about 200° F. to about 300° F. and a heavy fraction having an initial boiling point above about 200° F.; reacting said heavy fraction and hydrogen in a first reaction zone at a temperature less than about 500° F., combining at least a portion of the effluent from said first zone with said light fraction, and reacting the resulting mixture and hydrogen in a second reaction zone at a temperature less than about 500° F., raising the temperature of the effluent from said second zone and passing the heated effluent into a third reaction zone; effecting further reaction of said distillate and additional hydrogen in third zone at a temperature in excess of about 500° F., separating the effluent from said third reaction zone into a gaseous product and a liquid product, and commingling separate portions of said liquid product with the aforesaid light and heavy fractions prior to reacting the same in said second and first reaction zones, respectively.

A more limited embodiment of the present invention affords a process for hydrorefining an unsaturated, coke-forming hydrocarbon distillate, which process comprises initially fractionating said distillate to provide a light fraction having an end boiling point of from about 250° F. to about 280° F. and a heavy fraction having an initial boiling point above about 250° F.; reacting said heavy fraction and hydrogen in a first reaction zone at a temperature within the range of from about 300° F. to about 500° F., combining at least a portion of the effluent from said first zone with said light fraction and reacting the resulting mixture with hydrogen in a second reaction zone at a temperature of from about 300° F. to about 500° F., raising the temperature of the second zone effluent and passing the heated effluent into a third reaction zone; effecting further reaction of said distillate and additional hydrogen in said third zone at a temperature within the range of from about 500° F. to about 800° F., separating the effluent from said third reaction zone into a gaseous product and a liquid product, and commingling separate portions of said liquid product with the aforesaid light and heavy fractions in an amount to result in a combined feed ratio to each of said first and second reaction zones, within the range of from about 1.2:1 to about 6:1; the process being further characterized in that said first, second and third reaction zones have disposed therein a hydrorefining catalytic composite of at least one metallic component from the group of metals of Groups VI-A and VIII of the Periodic Table, and compounds thereof.

From the foregoing embodiments, it is readily ascertained that the process of the present invention, for the hydrorefining of a full boiling range, unsaturated, coke-forming hydrocarbon distillate, involves the utilization of at least three individual, distinctly separated reaction zones. Through the utilization of a particular sequence of processing steps, at particular operating conditions, the formation of high molecular weight polymers and copolymers, and the yield loss represented by the deposition of coke and other heavy carbonaceous material, is inhibited to a degree which permits processing the full boiling range charge for an extended period of time. The sequence of processing steps, hereinafter set forth in greater detail, regulates the hydrorefining process in such a manner that the deleterious components of the charge stock are never at conditions which selectively promote either coke-forming, or polymerization and copolymerization reactions during the course of the process, but which charge stock is ultimately subjected to a hydrorefining process at those conditions which would ordinarily produce coke and polymerization products were it not for the particular sequence of processing steps. Briefly, the object of the present invention is accomplished by initially fractionating the material to be processed into a light fraction and a heavy fraction, the cut-point being at a temperature within the range of about 200° F. to about 300° F., initiating the hydrorefining of each of the two resulting hydrocarbon fractions at temperatures below about 500° F. and in the presence of a previously hydrorefined, substantially saturated liquid product, at which temperatures diolefinic hydrocarbons are selectively saturated, at least in part, without the attendant coke-forming polymerization reactions also being promoted. That is to say, the light fraction will have an end boiling point, in accordance with standard ASTM distillation methods, of from about 200° F. to about 300° F., and the heavy fraction will contain those hydrocarbons normally boiling in excess of the selected end boiling point. In most of the applications of the process of the present invention, it is desirable that the end boiling point of the light fraction lie in the range of from 250° F. to about 280° F., with the heavy fraction having an initial boiling point above about 250° F., and this constitutes the preferred range.

In the preferred method of conducting the present process the reaction of the heavy fraction with hydrogen is effected in the first reaction zone, the light fraction is commingled with at least a portion of the first reaction zone effluent, and the resulting mixture is passed into a second reaction zone for the purpose of effecting the saturation of the light fraction. The total effluent product from the second reaction zone is admixed with additional hydrogen, its temperature is increased to a level above about 500° F., and subjected to further hydrorefining in a third reaction zone for the purpose of removing the contaminating sulfurous and nitrogenous compounds, and to complete the saturation of the di-olefinic hydrocarbons as well as the original mono-olefinic hydrocarbons. Thus, as the original hydrocarbon charge stock passes through the series of processing steps, the operating conditions are imposed at the necessary desired level, but only as is consistent with the coke-forming and polymerization tendencies of the material being processed.

In a preferred embodiment, the process of the present invention is effected in a sequence of contacting, or reaction zones, each of which functions at operating conditions which are consistent with the chemical characteristics of the particular hydrocarbon mixture passing therethrough. That is, the hydrocarbon distillate is subjected to hydrorefining under the most advantageous conditions, and in such a manner as to preclude the presence of other hydrocarbons having an adverse influence upon the desired hydrorefining reactions. Thus, an essential feature of the present process, for hydrorefining a full boiling range hydrocarbon distillate, is to fractionate said distillate at a cut-point of from about 200° F. to about 300° F., to provide a light fraction having this as an initial boiling point, prior to contacting any portion thereof with the catalytic composite disposed within any one of the reaction zones. In some situations, an extreme degree of unsaturation of the charge stock may result in too great a temperature rise in the reaction zones, due to the exothermicity of the reaction. That is, the degree of saturation being effected in a particular reaction zone it at least partially indicated by the temperature differential experienced across the catalyst disposed therein. In such instances, it may be desirable to provide for multi-point introduction of the charge stock at various intermediate sections of the reaction zone, thereby preventing a high degree of saturation from occurring in one particular portion of the catalyst bed, and also to provide cooling of the charge stream as it passes through the reaction zone. On the other hand, internal quench streams of a previously hydrorefined material may be employed when excessive temperature rise is an aspect to be considered. Preferably, and particularly in large scale commercial installations, the process of the present invention is most advantageously effected in three or more reaction zones having adequate heat-exchange facilities therebetween, in conjunction with recycle of previously hydrorefined liquid product.

The process of the present invention may be understood more clearly through reference to the accompanying drawing which illustrates one particular embodiment thereof. It is understood that the drawing, as well as the explanation thereof, is given for the sole purpose of illustration; it is not intended to limit the process of the present invetnion to the particular flow so illustrated. In the interest of simplicity and clarity, various heaters, condensers, compressors, valves, controls, instruments, etc., have been eliminated from the drawing; only those vessels and connecting lines necessary for the complete understanding of the process are indicated. In explanation of the drawing, the hydrocarbon charge stock will be assumed to be a full boiling range hydrocarbon distillate having an initial boiling point of about 125° F. and an end boiling point of about 500° F., and which contains about 1000 p.p.m. each of combined sulfur and nitrogen.

The embodiment presented in the drawing illustrates that method in which the heavy fraction is subjected to reaction with hydrogen in the first reaction zone, and the effluent therefrom is admixed with the light fraction prior to passing the latter into the second reaction zone. This method is preferred to that in which the light fraction is first reacted with hydrogen, the reaction product then being admixed with the heavy fraction prior to charging the second reaction zone. The former, preferred method has the advantage of requiring less recycled hydrorefined product to the second zone. Thus, the combined feed ratio to the second zone may range from about 1:1 (no additional hydrorefined product added to the mixture of the light fraction and first zone effluent) to about 6:1. Where the charge stock contains highly excessive quantities of unsaturated hydrocarbons, the combined feed ratio to both the first and second reaction zones is within the range of from about 1.2:1 to about 6:1.

Referring now to the drawing, the hydrocarbon charge stock is initially introduced into the process flow through line 1, being separated in fractionator 2 to provide a light fraction having an end boiling point of about 260° F., leaving via line 8, and a heavy fraction having an initial boiling point above about 260° F., leaving via line 3. The heavy fraction in line 3 is combined with a recycled, hydrogen-rich gas stream in line 18, the source of which is hereinafter set forth, the mixture passing through heat exchanger 4 wherein the temperature thereof is increased to a level within the range of about 300° F. to about 500° F. The heated mixture of the heavy fraction and hydrogen continues through line 5 into reaction zone 6. Provisions are also made, as will be noted, to admix a previously hydrorefined, totally saturated liquid product from line 17 with the heavy fraction in line 3, prior to passing the same through heat-exchanger 4. The recycle stream in line 17 employed in an amount to result in a combined feed ratio to reaction zone 6 in excess of about 1.2:1. The combined feed ratio is, of course, defined as the ratio of the total liquid hydrocarbon charge to reaction zone 6, to the fresh hydrocarbon charge contained therein; preferably, the combined feed ratio will have an upper limit of about 6:1. The reaction zone effluent in line 7 is then admixed with the light fraction in line 8, the mixture passing through heat exchanger 9 and line 10 into reaction zone 11. The light fraction and liquid effluent from reaction zone 6 is admixed with a previously hydrorefined liquid product in line 16, where, as hereinabove set forth, additional saturated product is desired, and a hydrogen-rich recycle gas stream in line 15. An essential feature of the present invention is that the operating temperature within both reaction zones 6 and 11 is within the range of about 300° F. to about 500° F., at which temperature at least a partial hydrogenation of the diolefins and mono-olefins is effected without the attendant polymerization and copolymerization thereof. The inclusion of a previously hydrorefined, totally saturated liquid product within the charge to these reaction zones is necessary in order to further insure against the formation of the polymerization products, and to control the temperature rise across the catalyst disposed within the reaction zones. Reaction zone 6 is maintained under a pressure within the range of about 450 to about 900 pounds per square inch gauge, which pressure is approximately 20 pounds per square inch gauge higher than that maintained upon reaction zone 11, in order to compensate for the normal pressure drop experienced in passing the material to be processed from reaction zone 6 through the attendant manifolding into reaction zone 11.

The substantially hydrogenated product effluent from reaction zone 11 passes through line 12, being admixed with additional hydrogen from line 14, the mixture passing into heater 13. Heater 13 serves to raise the temperature of the mixture to the desired operating temperature, within the range of about 500° F. to about 800° F. The additional hydrogen, entering the process via line 14, is employed in an amount to compensate for that hydrogen which is consumed within the three reaction zones of the process during the hydrogenation of the unsaturated hydrocarbons, and while effecting the destructive removal of sulfurous and nitrogenous compounds. The heated mixture is passed through line 19 into reaction zone 20 which is maintained under a pressure of from about 450 to about 900 pounds per square inch, however, at a slightly lower pressure than that imposed upon either reaction zone 6 or reaction zone 11. The elevated temperature in reaction zone 20 is necessary to complete the saturation of the diolefinic and mono-olefinic hydrocarbons, and to convert nitrogenous and sulfurous compounds into ammonia, hydrogen sulfide and hydrocarbons. When the process is operating efficiently, the diene value of the liquid hydrocarbons entering reaction zone 20, a measure of the concentration of the diolefinic hydrocarbons contained therein, will be less than about 2.0 and preferably less than about 1.5. The third reaction zone 20 serves the primary function of completing the hydrogenation of the remaining original mono-olefins and diolefinic hydrocarbons, without the attendant saturation of the highly desirable aromatic hydrocarbons contained within the original hydrocarbon charge; furthermore, the nitrogenous and sulfurous compounds will be converted into hydrocarbons, ammonia and hydrogen sulfide.

The total liquid product from reaction zone 20, the normally liquid portion of which is substantially completely saturated, is passed via line 21 through heat exchangers 4 and 9, and is subsequently further cooled to approximately room temperature in cooler 22, prior to passing through line 23 into separator 24. Separator 24 operates under essentially the identical pressure as reaction zone 20, and, in fact, is that point within the process from which the operating pressure, imposed upon the three reaction zones, is controlled. Furthermore, the control of the operating pressure within separator 24 may be employed as an indication of the quantity of make-up hydrogen which must necessarily be added to the process via line 14. Separator 24 operates at essentially ambient temperature of the order of 100° F. or less, and serves to separate the total product effluent from reaction zone 20 into a gaseous phase and a normally liquid hydrocarbon phase. The gaseous phase, substantially rich in hydrogen, and containing ammonia, hydrogen sulfide, and light paraffinic hydrocarbons such as methane, ethane and propane, is withdrawn from separator 24 via line 25, being passed into compressor 32, discharging therefrom through line 15, and subsequently being admixed with the light fraction in line 8 and the heavy fraction in line 3, the latter via line 18. At least a portion of the gaseous phase in line 25 is withdrawn from the system via line 26 containing pressure control valve 27, for the purpose of preventing any undue build-up of ammonia and hydrogen sulfide resulting from the conversion of the contaminating sulfurous and nitrogenous compounds.

At least a portion of the normally liquid product effluent from separator 24 is removed via line 16, continuing therethrough to combine with the light fraction and total effluent from reaction zone 6, for the purpose of providing the hydrorefined product effluent which is admixed therewith. At least a portion of the liquid product effluent in line 16 passes through line 17 to combine with the heavy fraction in line 3 prior to passing the same through heat exchanger 4. As indicated in the drawing, the source of the hydrorefined product being recycled to combine with the fresh hydrocarbon charge to reaction zones 6 and 11, is the total normally liquid product effluent from separator 24, being removed therefrom via line 16. This particular method is preferred to that method in which the hydrorefined product recycle would be obtained from the bottoms fraction of stripper 29, into which the remainder of the total liquid product effluent is introduced via line 28, although the latter method has the advantage of recycling only the liquid portion of the hydrorefined product. The scheme illustrated has the advantage of being essentially at the operating pressure of reaction zones 6 and 11, and does not, therefore, require extensive repressuring. Furthermore, the size of the vessel required to serve as stripper 29, from which any remaining light paraffinic hydrocarbons are removed via line 30, and the normally liquid, totally saturated product is removed via line 21 is lessened significantly when the recycled hydrorefined product is withdrawn from separator 24. In some instances, the product stream being recycled may be obtained from both sources for the purpose of facilitating the control of the various temperatures and flow rates within the process. Other various modifications may be made to the illustrated embodiment by those possessing the requisite skill within the art of petroleum processing, and it is not intended that such modifications shall remove the resulting process from the broad scope and spirit of the present invention as set forth in the appended claims. To illustrate, separator 24 may be combined with additional separating and/or adsorbing means, whereby a somewhat different flow pattern and apparatus arrangement results. For example, water-injection may be provided in line 23 for the purpose of adsorbing the ammonia therein, the water and adsorbed ammonia being removed by suitable liquid level control means from separator 24. Similarly, the gaseous phase from separator 24 and line 25, may be so treated as to effect substantially complete removal of hydrogen sulfide and/or light paraffinic hydrocarbons. Also, through the use of a suitable piping arrangement, a hydrorefined product recycle storage vessel may be installed, the rate of the recycle to each of reaction zones 6 and 11 being separately controlled and maintained through the use of individual pumps. As hereinabove set forth, such modifications are readily recognized by those possessing skill within the art, and are not intended to limit unduly the process of the present invention.

The hydrocarbon charge to reaction zones 6 and 11 will be of an amount to result in a liquid hourly space velocity (defined as volumes of hydrocarbon charge per hour, per volume of catalyst disposed within the reaction zone) within the range of from about 0.5 to about 10.0. As previously stated, the quantity of hydrorefined product effluent being recycled via lines 16 and 17, to combine with the fresh hydrocarbon charge in lines 8 and 3 respectively, is preferred to be of an amount such that the combined feed ratio to each of the reaction zones 6 and 11, lies within the range of from about 1.2:1 to about 6:1. The recycled hydrogen-rich gas stream, being admixed with the hydrocarbon charge to reaction zones 6 and 11 will be of an amount within the range of from about 500 to about 2500 standard cubic feet per barrel of hydrocarbon charge to each of the reaction zones. It is preferred, and a more efficient operation is effected when the hydrogen being recycled is less than about 1000 standard cubic feet per barrel of the total hydrocarbon charge entering the two reaction zones. Make-up hydrogen may be introduced into the process from any suitable exterior source, and will be of an amount to compensate for that quantity of hydrogen being consumed within the three reaction zones of the process for the destructive removal of sulfurous and nitrogenous compounds, and for the saturation of the diolefinic and monoolefinic hydrocarbons. The make-up hydrogen actually enters the process in the effluent line from second reaction zone 11; by this method, only the fresh hydrocarbon charge is permitted to pass into the first two reaction zones without having been processed in at least one of three reaction zones.

The three-stage hydrorefining process of the present invention is a catalytic process, and the catalyst employed may be of the same, or different chemical and physical characteristics in all three of the reaction zones. Suitable hydrorefining catalytic composites for utilization in the process of the present invention, comprise metallic components selected from the group consisting of Groups VI-A and VIII of the Periodic Table, and compounds thereof. Thus, the catalyst will comprise at least one metallic component selected from the group consisting of chromium, molybdenum, tungsten, iron, cobalt, nickel, ruthenium, rhodium, palladium, osmium, iridium, platinum, and mixtures of two or more, etc. The preferred catalytic composite comprises molybdenum and at least one metallic component selected from the iron-group of the Periodic Table. The molybdenum component will generally be of the greater concentration, from about 4.0% to about 30.0% by weight, while the iron-group metallic component will be present in an amount within the range of from about 1.0% to about 6.0% by weight, such concentrations being calculated on the basis of the elemental metals, notwithstanding that the same may exist in some combined form with the other components of the catalyst. Platinum group metals may be advantageously employed in concentrations of from about 0.1% to about 2.0% by weight. An essential feature of the catalytic composite is that the catalytically active metallic components, hereinabove set forth, be supported on a non-acidic carrier material. Generally, catalytically active metallic components are composited with any suitable refractory inorganic oxide material including alumina, silica, zirconia, thoria, hafnia, magnesia, titania, mixtures of two or more, etc. Similarly, other components are often combined with the metallic components and carrier material; these generally include the members of the halogen family, and particularly fluorine and/or chlorine. However, these components, as well as at least a few of the various refractory inorganic oxides above set forth, impart a particular acid-acting function to the catalytic composite, which function is not desirable in the process of the present invention. For example, a carrier material comprising a combination of alumina and silica, will possess sufficient hydrocracking activity to affect detrimentally the attainment of the specific object of the present invention. Therefore, it is an essential feature of the process of the present invention that the catalytically active metallic components be composited with an on-acidic refractory inorganic oxide carrier material, the term being specifically intended to preclude the utilization of members of the halogen family and other components which might impart an acid-acting function to the catalyst. Therefore, a particularly preferred carrier material, for utilization in manufacturing the catalyst employed in the process of the present invention, comprises alumina in any one of its many anhydrous forms, or as aluminum hydroxide. Although any suitable means may be employed for the manufacture of the catalytic composite, a convenient method involves the use of impregnating techniques on a preformed alumina carrier material. For example, a catalyst consisting essentially of about 2.2% by weight of cobalt, and about 5.7% by weight of molybdenum, calculated as the elements, may be prepared by impregnating alumina particles of any suitable size and/or shape with a single impregating solution of suitable water-soluble compounds of cobalt and molybdenum. A double impregnation technique may be effected whereby the molybdenum component is first composited with the carrier material, the thus impregnated material being subjected to high-temperature calcination, followed by a second impregnating procedure in which the cobalt component is combined threwith. Suitable water-soluble compounds, for use in preparing the impregnating solution, include molybdic acid, ammonium molybdate, cobalt nitrate hexahydrate, cobalt chloride hexahydrate, nickel cobalt hexahydrate, etc. Following the impregnation, the catalyst is dried at a temperature within the range of from about 200° F. to about 400° F., and thereafter subjected to a calcination technique, in an atmosphere of air, at an elevated temperature of from about 500° F. to about 1000° F., or more. The calcined, impregnated carrier material may be subsequently treated in any manner designed to cause the metallic components to exist in a particularly desired form. Thus, the composite may be treated for the purpose of converting the metallic component substantially to the form of oxides, sulfides, sulfate, etc., or to its most reducible valence state.

When the foregoing conditions of operation and processing techniques are followed, the process of the present invention is capable of successful, efficient operation for an extended period of time. However, as with virtually all catalytically conducted processes, there exists an inherent, naturally-occurring degree of deactivation of the catalytic composite employed within the various reaction zones. Such deactivation is not necessarily the rapid deactivation which conceivably could result from various major operating upsets due to interruptions in flow, abrupt changes in operating conditions, power failures, etc. In the present three-stage hydrorefining process, the catalyst will ultimately attain a level of deactivation as a result of the natural deterioration of the catalytically active metallic components, the deposition of coke and other carbonaceous material during the prolonged period of operation, and the formation of various polymerization products, all of which have the tendency to shield the active centers and surfaces of the catalyst from the material being processed. Although the processing techniques of the present invention permit the utilization of the catalytic composite for an extended period of time by virtually eliminating the polymerization and copolymerization reactions, it is particularly impossible for such reactions to be eliminated completely. Similarly, the deposition of coke and other carbonaceous material will eventually attain the level at which the catalyst becomes deactivated to the extent that the process is no longer economically feasible. In such instances, the catalyst may readily be reactivated by a rather simple expediency which does not require an extended period of process down-time.

Following a prolonged period of operation, when it appears that the catalyst has become deactivated to the extent that reactivation is economically desirable, the introduction of the hydrocarbon charge stock is ceased, but the plant pressure is maintained by continuing the circulation of the hydrogen-rich gas stream. For the purposes of regeneration, the temperature of the first and second stages of the present process is increased to a level within the range of that normally maintained upon the third reaction zone; that is, within the range of about 500° F. to about 800° F. The circulating hydrogen-rich gas stream serves to strip the catalyst of the various polymerization products formed during the period of operation, and effects such stripping in the relatively short period of time within the range of about 8 to about 12 hours. In those instances where the catalytic deactivation appears to have resulted from the deposition of coke and carbonaceous material such material may be effectively removed by burning in an atmosphere of air. The operating temperature on the first and second reaction zones is then decreased to a level below about 500° F., and the fresh hydrocarbon charge stock, in admixture with hydrorefined recycled product, is reintroduced to the system.

The following example is given to illustrate further the process of the present invention, and to indicate the benefits afforded through the utilization thereof. It is not intended to limit unduly the process of the present invention to the charge stock, operating conditions, and/or catalytic composite employed therein.

*Example*

The hydrocarbon distillate employed in this example is a full boiling range naphtha by-product from a commercial cracking unit designed and operated for the production of ethylene. The primary object, for which this hydrocarbon distillate is to be hydrorefined, is to utilize the hydrorefined product effluent as charge material to a unit designed for the recovery of the aromatic hydrocarbons contained in this particular hydrocarbon distillate in an amount of about 50% by volume. A hydrocarbon distillate of this nature is further characterized by a large proportion of mono-olefinic hydrocarbons and di-olefinic hydrocarbons, and is contaminated by sulfurous and nitrogenous compounds in an amount of about 1000 p.p.m. each. The charge stock, having a ° API gravity at 60° F., of about 37.5, has an initial boiling point of about 125° F. and an end boiling point of about 500° F. The unsaturated hydrocarbons are concentrated in the lower-boiling portion of this particular charge stock, that fraction having an end boiling point of about 260° F. indicating a diene value of about 30.0 and a bromine number of about 70.0; the heavier fraction indicates a diene value of about 15.0 and a bromine number of about 35.0. Prior to being processed according to the method of the present invention, this particular hydrocarbon charge stock is not suitable as material from which the aromatic hydrocarbons, benzene, toluene, and xylene could be recovered, nor could the remaining portion of the distillate be utilized as a motor fuel blending component or as charge stock to a catalytic reforming unit. Furthermore, the distillate is not acceptable for charge to a molecular sieve separation process for the purpose of recovering the normal paraffinic hydrocarbons. Therefore, it becomes necessary to effect the destructive removal of the sulfurous and nitrogenous compounds, and to saturate the olefins and diolefins, performing this function in a manner which insures the continuous production of a material suitable for utilization as charge to the aromatic recovery unit over an extended period of time.

The catalytic composite, within each of the three reaction zones, is a pre-sulfided composite of alumina, 2.2% by weight of cobalt, and 5.7% by weight of molybdenum, the latter being calculated as the elements thereof. The composite is prepared utilizing ⅛-inch by ⅛-inch cylindrical alumina pills, calcined at an elevated temperature of about 1100° F. The cobalt and molybdenum components are composited therewith through the utilization of a single impregnating solution containing the requisite quantities of molybdic acid (85% molybdenum oxide) and cobalt nitrate hexahydrate. Following the impregnation procedure, the impregnated composite is dried, calcined at an elevated temperature of 1000° F., and thereafter sulfided utilizing a mixture of hydrogen and hydrogen sulfide.

The charge stock is initially fractionated to provide a light fraction containing all those components boiling below a temperature of about 260° F., and a heavier fraction containing those components boiling at temperatures in excess of about 260° F. The heavy fraction is passed into a first reaction zone maintained at an inlet temperature thereto of about 400° F., in the presence of about 1500 standard cubic feet per barrel of recycle hydrogen and a previously hydrorefined liquid product recycle, the latter in an amount to result in a combined feed ratio to the first reaction zone of about 2:1. Similarly, the lighter fraction, in admixture with recycle hydrogen in an amount of about 1500 standard cubic feet per barrel, a previously hydrorefined product recycle stream in an amount to result in a combined feed ratio of about 1.2:1, and the effluent from the first reaction zone, is passed into a second reaction zone maintained at an inlet temperature of about 400° F. In this type of operation, various items may be employed to indicate the effectiveness of the operation: the pressure differential measured across each of the reaction zones, or from the discharge of the recycle gas compressor to the controlled pressure of the high pressure separator in the effluent line from the third reaction zone, is indicative of that quantity of polymerization products which have become deposited within the reaction zone and the attendant piping during the course of the process; the temperature differential across any of the catalyst beds is an indication of the degree of hydrogenation being effected within a particular reaction zone. The effluent stream from the second reaction zone, now substantially completely free from di-olefinic hydrocarbons, as indicated by diene values of less than about 1.5, but containing quantities of mono-olefinic hydrocarbons, resulting from those originally contained in the hydrocarbon distillate, and those resulting from the partial hydrogenation of the diolefinic hydrocarbons, is then passed into the third reaction zone. A measure of the effectiveness of the operation at this particular point thereof, is the diene value of the second reaction zone product effluent stream. The effluent from the second reaction zone is then combined with that quantity of make-up hydrogen required to compensate for the amount consumed in effecting the over-all process, the mixture being raised to an elevated temperature of about 600° F., prior to being passed into the third reaction zone. As hereinbefore stated, the temperature differential across the catalyst bed is an indication of the quantity of hydrogenation being effected therein. Since hydrogenation is an exothermic reaction, the temperature at the outlet of the reaction zone will be substantially greater than the temperature at the inlet to the catalyst bed. Therefore, as illustrated in the accompanying drawing, the product effluent from the third reaction zone is a convenient source of material which may be utilized as a heat-exchange medium to raise the temperature of the charge to the first and second reaction zones to the desired level.

Following its utilization as a heat-exchange medium, the effluent product from the third reaction zone is further cooled to a temperature of about 100° F. or less, and is passed into a high-pressure separator for the purpose of removing a hydrogen-rich gas stream containing ammonia and hydrogen-sulfide, at least a portion of which is withdrawn on pressure control for the purpose of maintaining a relatively high degree of hydrogen purity. The remaining portion of the gaseous hydrogen-rich stream is recycled to combine with the liquid charge to the first and second reaction zones in predetermined amounts of about 1500 standard cubic feet per barrel of charge. The normally liquid product effluent, following separation in the high-pressure separator, is passed into a suitable stripping column which serves to remove light paraffinic hydrocarbons and any remaining ammonia and hydrogen sulfide. An indication of the over-all effectiveness of the entire process is the measure of the bromine number and diene value of the stripper bottoms product. The stripper bottoms, that is, the ultimate charge to the aromatic recovery unit, indicates a diene value of from about 0.15 to 0.30, and a bromine number substantially less than about 0.5. The low evaluation of diene value and bromine number, on the stripper bottoms product, plus the fact that the above-all pressure drop across the unit is not noticeably increasing to a prohibitive level, indicates that the process as herein set forth is capable of efficient operation for an extended period of time. It should be noted that those components of the original hydrocarbon distillate which would normally tend to copolymerize with each other, under the processing conditions imposed upon the first and second reaction zones, that is, the unsaturated components boiling above about 260° F. and those boiling below about 260° F., have been individually treated in a manner which causes such components to become innocuous, whereby they may be subsequently combined and further treated to achieve the ultimate object. Furthermore, each individual fraction is separately treated under those conditions which inhibit excessive polymerization during the course of the operation.

Through the particular processing techniques of the present invention, it is possible to hydrorefine successfully a full boiling range, coke-forming hydrocarbon distillate without the attendant operating difficulties resulting from excessive deposition of coke and carbonaceous material, as well as the formation of polymerization and co-polymerization products.

I claim as my invention:

1. A process for hydrorefining an unsaturated, coke-forming hydrocarbon distillate which comprises initially fractionating said distillate to provide a light fraction having an end boiling point of from about 200° F. to about 300° F. and a heavy fraction having an initial boiling point above about 200° F.; reacting said heavy fraction and hydrogen in a first reaction zone at a temperature less than about 500° F., combining at least a portion of the effluent from said first zone with said light fraction, and reacting the resulting mixture and hydrogen in a second reaction zone at a temperature less than about 500° F., raising the temperature of the effluent from said second zone and passing the heated effluent into a third reaction zone; effecting further reaction of said effluent from the second zone and additional hydrogen in said third zone at a temperature in excess of about 500° F., separating the effluent from said third reaction zone into a gaseous product and a liquid product, and commingling separate portions of said liquid product with the aforesaid light and heavy fractions prior to reacting the same in said second and first reaction zones, respectively.

2. The process of claim 1 further characterized in that said light fraction has an end boiling point of from about 250° F. to about 280° F. and said heavy fraction has an initial boiling point above about 250° F.

3. The process of claim 1 further characterized in that the reactions within said first and second reaction zones are effected at a temperature within the range of from about 300° F. to about 500° F., and the reactions within said third reaction zone are effected at a temperature within the range of from about 500° F. to about 800° F.

4. The process of claim 1 further characterized in that liquid product from said third reaction zone is commingled with said light and heavy fractions in an amount to result in a combined feed ratio, to said first reaction zone in excess of about 1.2:1, and to said second reaction zone within the range of about 1:1 to about 6:1.

5. The process of claim 4 further characterized in that the combined feed ratio to each of said first and second reaction zones is within the range of from about 1.2:1 to about 6:1.

6. A process for hydrorefining an unsaturated, coke-forming hydrocarbon distillate which comprises initially fractionating said distillate to provide a light fraction having an end boiling point of from about 250° F. to about 280° F. and a heavy fraction having an initial boiling point above about 250° F.; reacting said heavy fraction and hydrogen in a first reaction zone at a temperature within the range of from about 300° F. to about 500° F., combining at least a portion of the effluent from said first zone with said light fraction and reacting the resulting mixture with hydrogen in a second reaction zone at a temperature of from about 300° F. to about 500° F., raising the temperature of the second zone effluent and passing the heated effluent into a third reaction zone; effecting further reaction of said distillate and additional hydrogen in said third zone at a temperature within the range of from about 500° F. to about 800° F., separating the effluent from said third reaction zone into a gaseous product and a liquid product, and commingling separate portions of said liquid product with the aforesaid light and heavy fractions in an amount to result in a combined feed ratio, to each of said first and second reaction zones, within the range of from about 1.2:1 to about 6:1; the process being further characterized in that said first, second and third reaction zones have disposed therein a hydrorefining catalytic composite of at least one metallic component from the group of metals of Groups VI–A and VIII of the Periodic Table, and compounds thereof.

7. The process of claim 6 further characterized in that the catalytic composite disposed within said first, second and third reaction zones comprises molybdenum and at least one metallic component from the metals of the iron-group of the Periodic Table, and compounds thereof.

8. The process of claim 6 further characterized in that the catalytic composite disposed within said first, second and third reaction zones comprises a non-acidic refractory inorganic oxide.

9. The process of claim 6 further characterized in that the hydrorefining catalyst, disposed within said first, second and third reaction zones, is a composite of a non-acidic refractory inorganic oxide, from about 4.0% to about 30.0% by weight of molybdenum and from about 1.0% to about 6.0% by weight of at least one metallic component from the metals of the iron-group of the Periodic Table, and compounds thereof.

References Cited in the file of this patent

UNITED STATES PATENTS

| | | |
|---|---|---|
| 2,303,118 | Frey | Nov. 24, 1942 |
| 2,878,179 | Hennig | Mar. 17, 1959 |
| 2,983,676 | Howland | May 9, 1961 |